(12) United States Patent
Ko et al.

(10) Patent No.: US 11,722,756 B2
(45) Date of Patent: Aug. 8, 2023

(54) CAMERA MODULE WITH DROPLET REMOVING DEVICE

(71) Applicant: SAMSUNG ELECTRO-MECHANICS CO., LTD., Suwon-si (KR)

(72) Inventors: Chan Hoon Ko, Suwon-si (KR); Won Kyu Jang, Suwon-si (KR); Hee Sung Jun, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/725,118

(22) Filed: Apr. 20, 2022

(65) Prior Publication Data

US 2022/0394158 A1 Dec. 8, 2022

(30) Foreign Application Priority Data

Jun. 7, 2021 (KR) .................... 10-2021-0073617

(51) Int. Cl.
*H04N 23/51* (2023.01)
*H04N 23/81* (2023.01)
*G03B 17/12* (2021.01)
*G02B 27/00* (2006.01)
*G03B 11/04* (2021.01)

(52) U.S. Cl.
CPC ......... *H04N 23/51* (2023.01); *G02B 27/0006* (2013.01); *G03B 11/043* (2013.01); *G03B 17/12* (2013.01); *H04N 23/811* (2023.01)

(58) Field of Classification Search
CPC ...... H04N 23/51; H04N 23/52; H04N 23/811; H04N 23/57; G02B 27/0006; G03B 17/12; G03B 11/043; G03B 17/02
See application file for complete search history.

(56) References Cited

U.S. PATENT DOCUMENTS 9,602,703 B1 * 3/2017 Raphael ............. G02B 27/0006
2017/0210351 A1 * 7/2017 Ghannam ................. B60S 1/50
2021/0396986 A1 * 12/2021 Mushtaque ............ A61B 1/121

FOREIGN PATENT DOCUMENTS

| CN | 207479065 U | | 6/2018 |
| JP | 2005-192114 A | | 7/2005 |
| JP | 2015-035722 A | | 2/2015 |
| JP | 2017-122795 A | | 7/2017 |
| JP | 2017122795 A | * | 7/2017 |
| JP | 2021-039381 A | | 3/2021 |

OTHER PUBLICATIONS

Machine English Translation of Kiyosue, JP 2017-122795 A, published on Jul. 13, 2017 (Year: 2017).*
Korean Office Action dated Jun. 14, 2022, in counterpart Korean Patent Application No. 10-2021-0073617 (6 Pages in English, 4 Pages in Korean).

* cited by examiner

*Primary Examiner* — Lin Ye
*Assistant Examiner* — Chriss S Yoder, III
(74) *Attorney, Agent, or Firm* — NSIP Law (57) ABSTRACT

A camera module is provided. The camera module includes: a housing; a lens barrel disposed in the housing; a cover screen disposed over the lens barrel; a blade pivotably coupled to the cover screen and configured to have at least a portion in contact with a surface of the cover screen; and a rotation member disposed on the blade and configured to pivot the blade with respect to the cover screen.

14 Claims, 6 Drawing Sheets

CAMERA MODULE WITH DROPLET REMOVING DEVICE

CROSS-REFERENCE TO RELATED APPLICATIONS

This application claims the benefit under 35 USC § 119(a) of Korean Patent Application No. 10-2021-0073617 filed on Jun. 7, 2021, in the Korean Intellectual Property Office, the entire disclosure of which is incorporated herein by reference for all purposes.

BACKGROUND

1. Field

The following description relates to a camera module with a droplet removing unit.

2. Description of Related Art

Recently, a camera module that is configured to be implemented in vehicles, has been typically mounted on the vehicle to assist in the safe driving of drivers in the following manner: the camera module may be installed on the front or rear areas of the vehicle to record traffic information and subjects disposed in the front and rear of the vehicle, images of the recorded traffic information and the recorded subjects may then be output through a display device installed in the vehicle, thus allowing the driver to monitor situations in the front and rear of the vehicle, especially situations in a blind spot to the rear of the vehicle. Additionally, as autonomous driving technology is developed, the camera module may also be installed on the vehicle to collect information regarding a surrounding environment of the vehicle.

The vehicle may be exposed to various environments, and the camera module mounted on the vehicle may thus also exhibit performance of a certain level or more in the various environments. In an example, when it rains or snows, droplets or snowflakes may partially or entirely cover a capturing region of the camera module, which may deteriorate image quality.

Typically, a heater may be mounted on a lens or a cover screen, disposed at an outermost portion of the camera module, to remove frost or droplets deposited on the surface thereof. The heater may effectively remove frost. However, the heater may not quickly remove relatively large-sized droplets. In particular, the camera installed on the vehicle may need to continuously and uninterruptedly collect the image information of the surrounding environment in real time. Accordingly, it may be beneficial to implement a unit or device that quickly removes the droplets.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a cameral module includes a housing; a lens barrel disposed in the housing; a cover screen disposed above the lens barrel; a blade pivotably coupled to the cover screen, and configured to have at least a portion in contact with a surface of the cover screen; and a rotation member disposed on the blade, and configured to pivot the blade with respect to the cover screen.

The blade may include an extension portion that extends in a direction away from a pivot shaft of the blade, and wherein the extension portion may be configured to wipe the surface of the cover screen when the blade is pivoted.

The cover screen may include a fixing pin, the blade may include a pin accommodation portion configured to accommodate the fixing pin, and the blade may be configured to pivot based on the fixing pin.

The blade may include a driving pin, the rotation member may include a slot configured to accommodate the driving pin, and the driving pin may be configured to move along the slot when the rotation member is moved.

The slot may be configured to extend in a radial direction based on an optical axis.

The rotation member may be disposed on the blade, and may be configured to have a shape of a disk comprising an incident hole corresponding to an optical axis.

The rotation member maybe rotatably coupled to the housing, based on the optical axis.

The blade may include a plurality of blades, and the plurality of blades may be arranged in a circumferential direction based on an optical axis.

The rotation member may be configured to be interlocked to the plurality of blades, and the plurality of blades may be configured to pivot in a same direction when the rotation member is rotated in a first direction.

The blade may include a fabric member disposed in a portion of the blade, and the fabric member may be configured to be in contact with the cover screen.

The cover screen may include a groove that extends in an outer surface of the cover screen in a circumferential direction based on an optical axis.

The cover screen may include a groove that extends in an outer surface of the cover screen in a radial direction based on an optical axis.

The cover screen may include a first groove that extends in an outer surface of the cover screen in a circumferential direction based on an optical axis, and a second groove that extends in the outer surface of the cover screen in a radial direction based on the optical axis, and the first groove and the second groove cross each other.

In a general aspect, a camera module includes a housing; a lens barrel disposed in the housing; a cover screen disposed over the lens barrel; and a plurality of blades, respectively pivotably coupled to the cover screen and each of the plurality of blades configured to have at least a portion in contact with a surface of the cover screen, wherein the plurality of blades are arranged in a circumferential direction based on an optical axis.

The cover screen may include a groove that extends in an outer surface of the cover screen in the circumferential direction based on the optical axis.

The cover screen may include a groove that extends in an outer surface of the cover screen in a radial direction based on the optical axis.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

Figure 1:
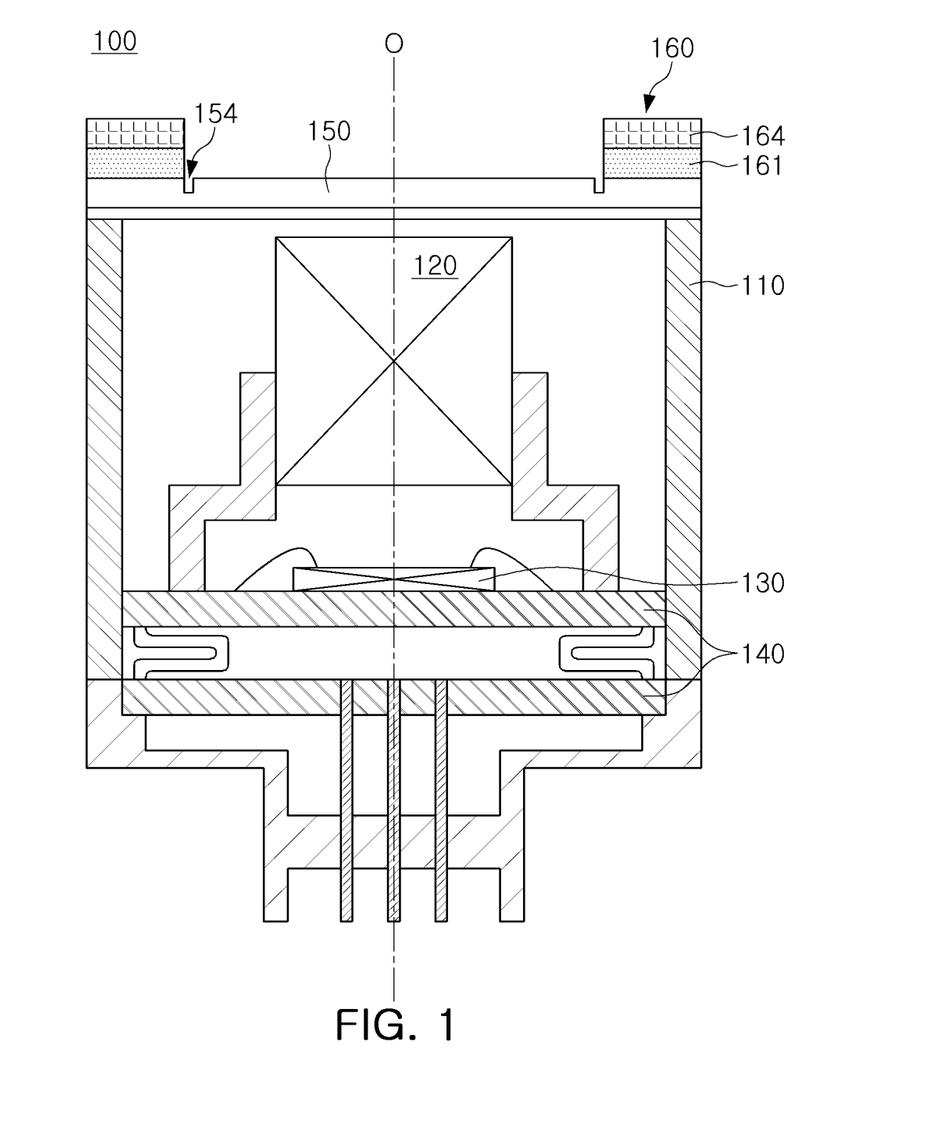
FIG. 1 illustrates a cross-sectional view of an example camera module, in accordance with one or more embodiments.

FIG. 1 is a cross-sectional view of an example camera module 100, in accordance with one or more embodiments.

Referring to FIG. 1, the example camera module 100 may include a housing 110, an imaging device (120, 130, 140), a cover screen 150 and a droplet removal device 160. The imaging device (120, 130, 140) may be accommodated in the housing 110, and may include a lens barrel 120, an imaging element 130 and a substrate 140. The cover screen 150 may be disposed on an object side of the imaging device. The lens barrel 120 may include at least one lens therein, and light passing through the lens may reach the imaging element 130 to be converted into an image signal. The image signal generated by the imaging element 130 may be transmitted to an external device of the camera module 100 through a circuit disposed on the substrate 140. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

The cover screen 150 may include a transparent material (e.g., transparent plastic or glass). The cover screen 150 may be a member exposed to an external environment, and foreign materials such as, but not limited to, droplets, snowflakes, frost and dust may thus be deposited on a surface of the cover screen 150. However, the cover screen 150 may be a device of the camera module, through which light collected by the imaging element 130 first passes, and it may be beneficial to remove the foreign materials deposited on the surface of the cover screen 150 in order for the imaging device to provide a high-quality image.

The droplet removal device 160 may be disposed on the cover screen 150, and may clean the surface of the cover screen 150. In an example, the droplet removal device 160 may include a blade 161 or one or more blades 161a, 161b, 161c which have at least a portion in contact with the surface of the cover screen 150. Similar to a wiper of a vehicle, the one or more blades 161a, 161b, 161c may be moved reciprocally on the cover screen 150 to remove foreign materials deposited on the surface of the cover screen 150, or at least sweep the foreign materials to a region away from an optical axis "O."

Figure 2:
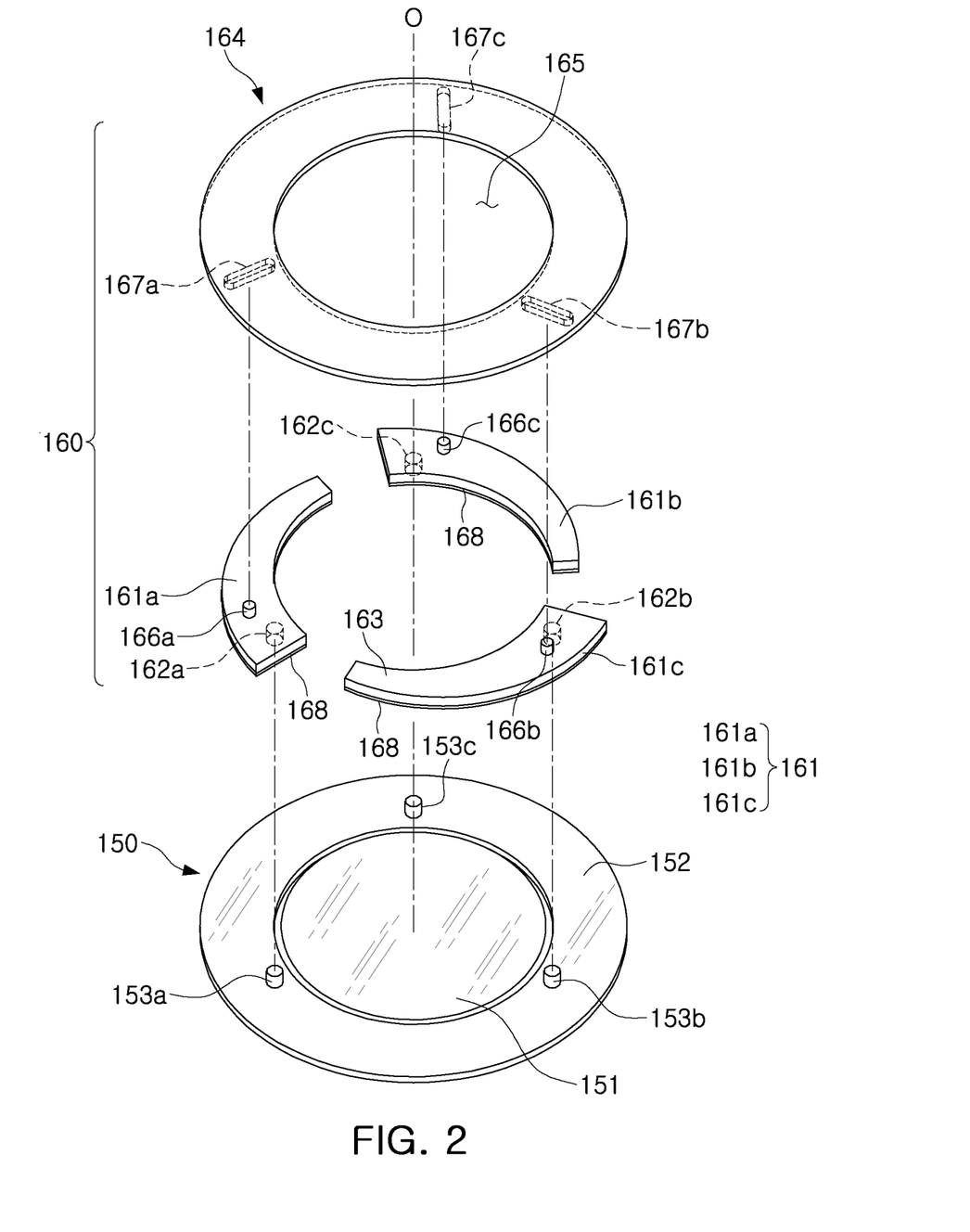
FIG. 2 illustrates an exploded perspective view of an example camera module, in accordance with one or more embodiments.
Figure 3:
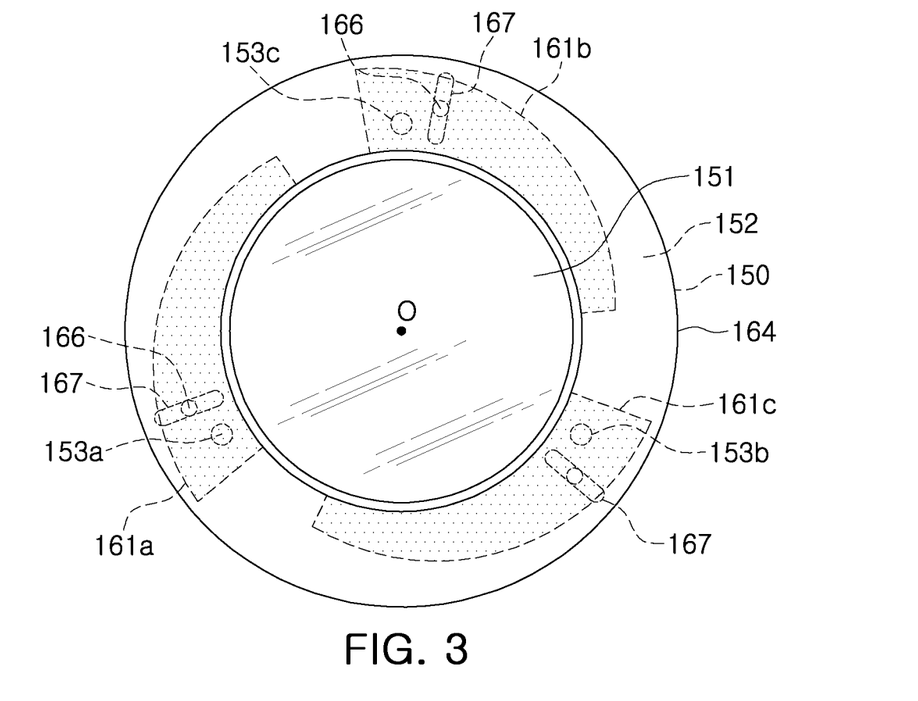
FIG. 3 illustrates a blade disposed in a central portion of a cover screen, in accordance with one or more embodiments.
Figure 4:
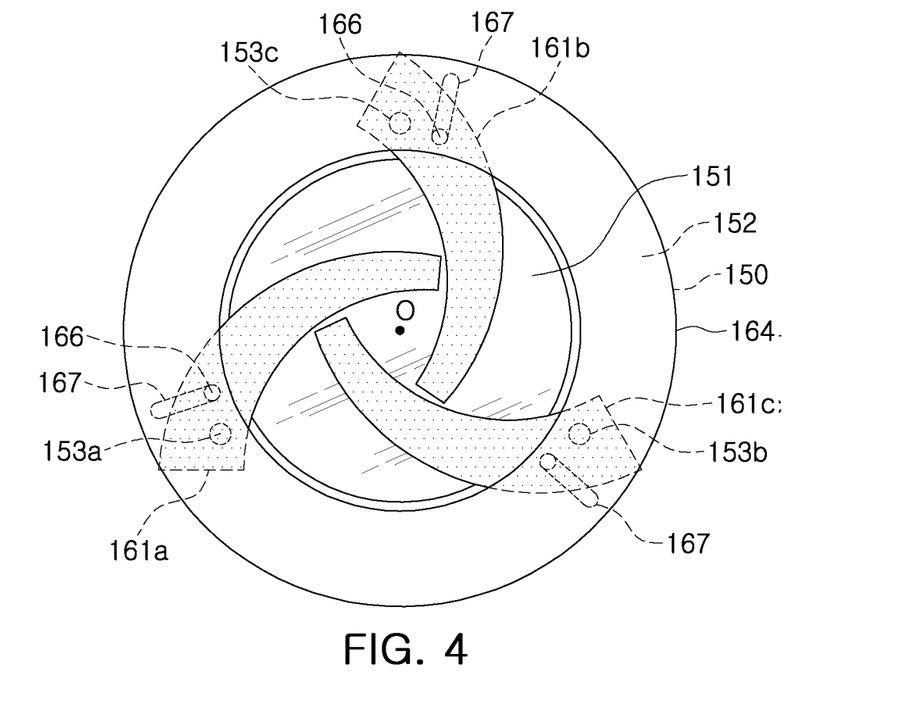
FIG. 4 illustrates a retraction of a blade, in accordance with one or more embodiments.

FIG. 2 is an exploded perspective view of the camera module 100, in accordance with one or more embodiments. FIG. 3 illustrates that one or more blades 161a, 161b, 161c may be disposed in a central portion 151 of a cover screen 150 in an example; and FIG. 4 illustrates that the one or more blades 161a, 161b, 161c may be retracted to a peripheral portion 152 of the cover screen 150 in an example.

Referring to FIG. 2, one fixing pin 153a, 153b, and 153c may be disposed on the cover screen 150. The one or more fixing pins 153a, 153b, and 153c may be integrally formed with the cover screen 150, or may be formed separately from the cover screen 150 and then may be coupled to the cover screen 150. The one or more blades 161a, 161b, 161c 1 may be inserted into the one or more fixing pins 153a, 153b, and 153c to be pivoted with respect to the cover screen 150. The one or more blades 161a, 161b, 161c may include one or more pin accommodation portions 162a, 162b, 162c that accommodates the one or more fixing pins 153a, 153b, and 153c on its bottom surface. In an example, the one or more fixing pins 153a, 153b, and 153c may have a cylindrical shape, and the one or more pin accommodation portions 162a, 162b, 162c may have a shape of a circular hole that accommodates the one or more fixing pins 153a, 153b, and 153c.

In the one or more examples, the one or more fixing pins 153a, 153b, and 153c may be positioned on the cover screen 150, and the one or more pin accommodation portions 162a, 162b, 162c may be respectively positioned in the one or more blades 161a, 161b, 161c. However, this structure may only be an example, and the one or more blades 161a, 161b, 161c and the cover screen 150 may include any structure as long as the one or more blades 161a, 161b, 161c are pivoted with respect to the cover screen 150. In an example, the one or more fixing pins 153a, 153b, and 153c may protrude from the bottom surface of the one or more blades 161a, 161b, 161c, and the one or more pin accommodation portions 162a, 162b, 162c may accommodate the one or more fixing pins 153a, 153b. and 153c positioned on the cover screen 150.

In an example, the one or more blades 161a, 161b, 161c may include an extension portion 163 that extends in a direction away from a pivot shaft of the blade 161 (i.e. a pivot shaft formed by coupling of the one or more fixing pins 153a, 153b, and 153c3 and the one or more pin accommodation portions 162a, 162b, 162c). While the one or more blades 161a, 161b, 161c 150. As the one or more blades 161a, 161b, 161c 61 is pivoted, the extension portion 163 may be moved between the central portion 151 and peripheral portion 152 of the cover screen 150 to remove the foreign material deposited on the cover screen 150.

In an example, when the one or more blades 161a, 161b, 161c is pivoted clockwise, based on the one or more fixing pins 153a, 153b, and 153c, the extension portion 163 may be disposed on the central portion 151 of the cover screen 150 (as shown in FIG. 4), and when the one or more blades 161a, 161b, 161c is pivoted counterclockwise, the extension portion 163 may be retracted to be disposed on the peripheral portion 152 of the cover screen 150 (as shown in FIG. 3). In the one or more examples, the central portion 151 of the cover screen 150 may indicate a region in a field of view (FOV) of the camera module 100, and the peripheral portion 152 may indicate a region outside of the field of view.

In one or more examples, the blade 161 may include a plurality of blades 161a, 161b and 161c. In one or more examples, the plurality of blades 161a, 161b and 161c may be arranged to surround the central portion 151 of the cover screen 150. In one or more examples, the plurality of blades 161a, 161b and 161c may be arranged to be spaced apart from one another in a circumferential direction based on the optical axis "O." In one or more examples, the plurality of blades 161a, 161b and 161c may be arranged to have the same distance therebetween in the circumferential direction.

In an example, a plurality of fixing pins 153a, 153b and 153c may be arranged on the cover screen 150 in the circumferential direction based on the optical axis "O," and the blades 161a, 161b and 161c may respectively be fitted to the plurality of fixing pins 153a, 153b and 153c. Referring to FIG. 2, the three fixing pins 153a, 153b and 153c may be arranged on the cover screen 150 to have the same distance therebetween in the circumferential direction, and the three blades 161a, 161b and 161c may respectively be fitted to the corresponding fixing pins 153a, 153b and 153c.

In order for one of the blades 161a, 161b and 161c to entirely clean the central portion 151, the extension portion 163 may have an increased length, a relatively large amount of driving force may be applied, or the blades 161a, 161b and 161c may have an increased pivot amount. Meanwhile, when the plurality of blades 161a, 161b and 161c share their role of cleaning the central portion 151, each blade 161a, 161b and 161c may need a smaller driving distance or driving force, and the droplet removal device 160 may thus more effectively remove the foreign materials.

FIGS. 2 through 5 illustrate that the droplet removal device 160 may include the three blades 161a, 161b and 161c, which is only an example, and in an example, the droplet removal device 160 may include four or more blades, or less than three blades. In a non-limited example, five blades may be arranged to have the same distance therebetween in the circumferential direction.

In an example, the droplet removal device 160 may include a rotation member 164 that is configured to rotate the blades 161a, 161b and 161c. In an example, the rotation member 164 may have a shape of a disk including an incident hole 165 corresponding to the optical axis "O."

In an example, the rotation member 164 may be rotated based on the optical axis "O." In an example, the camera module 100 may include a structure (not shown) which may limit a degree of freedom of the rotation member 164 included in the droplet removal device 160 to its rotation based on the optical axis "O," and the rotation member 164 may be mounted on this structure. In an example, the camera module 100 may further include a structure that surrounds at least a portion of an outer circumferential surface of the rotation member 164, and this structure may align a rotation axis of the rotation member 164 with the optical axis "O."

One or more driving pins 166a, 166b, 166c may be disposed on a respective top surface of the blades 161a, 161b and 161c may be accommodated in respective slots 167a, 167b, 167c positioned in a bottom portion of the rotation member 164. In an example, the slots 167a, 167b, 167c may be extended in a radial direction based on the optical axis "O." In an example, the slots 167a, 167b, 167c may be extended in a straight line, which is only an example, and in another example, the slots 167a, 167b, 167c may be extended in a curved line.

In an example, the rotation member 164 may be rotated based the optical axis "O" to drag the driving pin 166, thereby pivoting the blades 161a, 161b, 161c. In an example, when the rotation member 164 is rotated clockwise, the slots 167a, 167b, 167c may push the fixing pins 153a, 153b, 153c, thereby allowing the blades 161a, 161b, 161c to be pivoted clockwise. Additionally, as the rotation member 164 is rotated counterclockwise, the slots 167a, 167b, 167c may push the fixing pins 153a, 153b, 153c, thereby allowing the blades 161a, 161b, 161c to be pivoted counterclockwise.

In an example, the droplet removal device 160 may include an actuator rotating the rotation member 164. In an example, the actuator may rotate the rotation member 164, based on the optical axis "O." In an example, the actuator may include, as only examples, a piezo actuator, a voice coil motor, a shape memory alloy, a linear motor, etc.

The blades 161a, 161b and 161c may be pivoted in the same direction by being interlocked with one another by the rotation member 164. In an example, the rotation member 164 may be interlocked with the plurality of blades 161a, 161b and 161c for the plurality of blades 161a, 161b and 161c to be pivoted in the same direction when the rotation member 164 is rotated in one direction.

When the rotation member 164 is rotated clockwise as illustrated in FIG. 3, the blades 161a, 161b and 161c may be simultaneously pivoted clockwise, and the extension portions 163 may thus simultaneously reach the central portion 151 of the cover screen 150. Additionally, when the rotation member 164 is rotated counterclockwise as illustrated in FIG. 4, the blades 161a, 161b and 161c may be simultaneously pivoted counterclockwise, and the extension portions 163 may thus be retreated to the peripheral portion 152 of the cover screen 150.

In an example, the camera module 100 may control the blades 161a, 161b, 161c by implementing a sensor that identifies whether the foreign material is deposited on the cover screen 150. In an example, (an external processor of) the camera module 100 may determine whether to drive the blades 161a, 161b, 161c based on humidity information obtained by a humidity sensor. In another example, (the external processor of) the camera module 100 may identify whether the foreign material such as the droplet is deposited on its capturing region by implementing an image sensor, and may control the blades 161a, 161b, 161c, based on the identification of the foreign material.

In an example, one side of the blades 161a, 161b, 161c may have a curved edge. Accordingly, when the blades 161a, 161b and 161c are retracted, inner edges of the blades 161a, 161b and 161c may gather to surround the central portion 151 in a circular manner.

Figure 5:
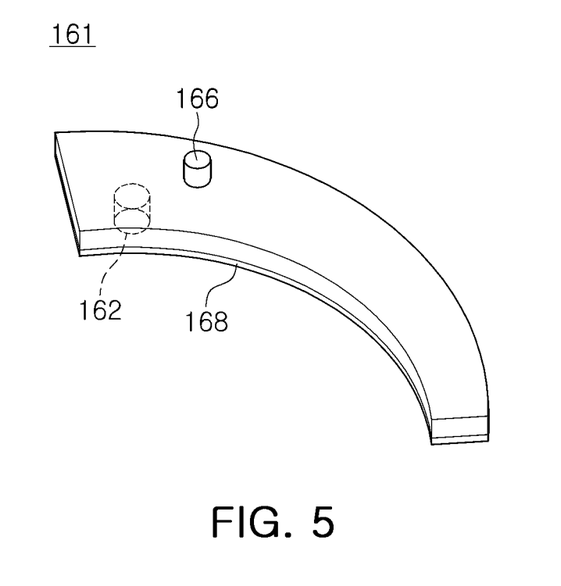
FIG. 5 illustrates a blade including a fabric member, in accordance with one or more embodiments.

FIG. 5 illustrates an example blade 161 including a fabric member 168, in accordance with one or more embodiments.

Referring to FIG. 5, the blade 161 may include the fabric member 168 at a portion of the blade 161, that is in contact with the cover screen 150. The fabric member 168 may include, as only an example, a fibrous tissue that may easily absorb a liquid such as water. By including the fabric member 168, the blade 161 may more effectively remove the liquid deposited on the cover screen 150.

Figure 6:
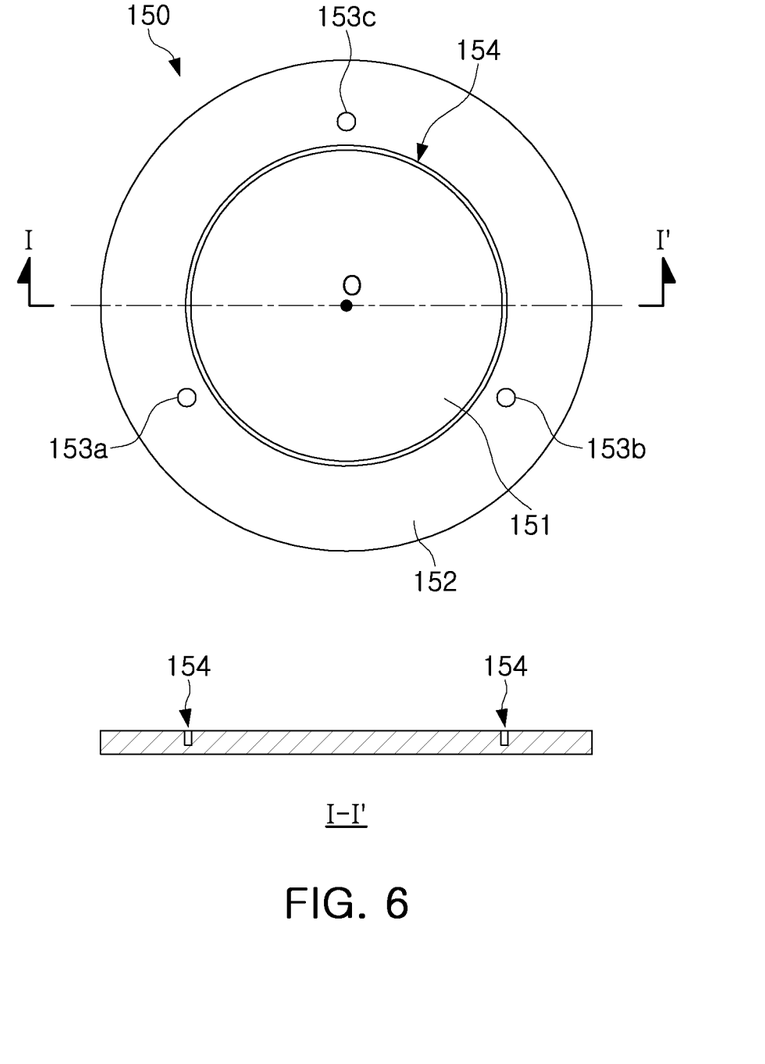
FIG. 6 illustrates a circular groove positioned in a surface of a cover screen, in accordance with one or more embodiments.
Figure 7:
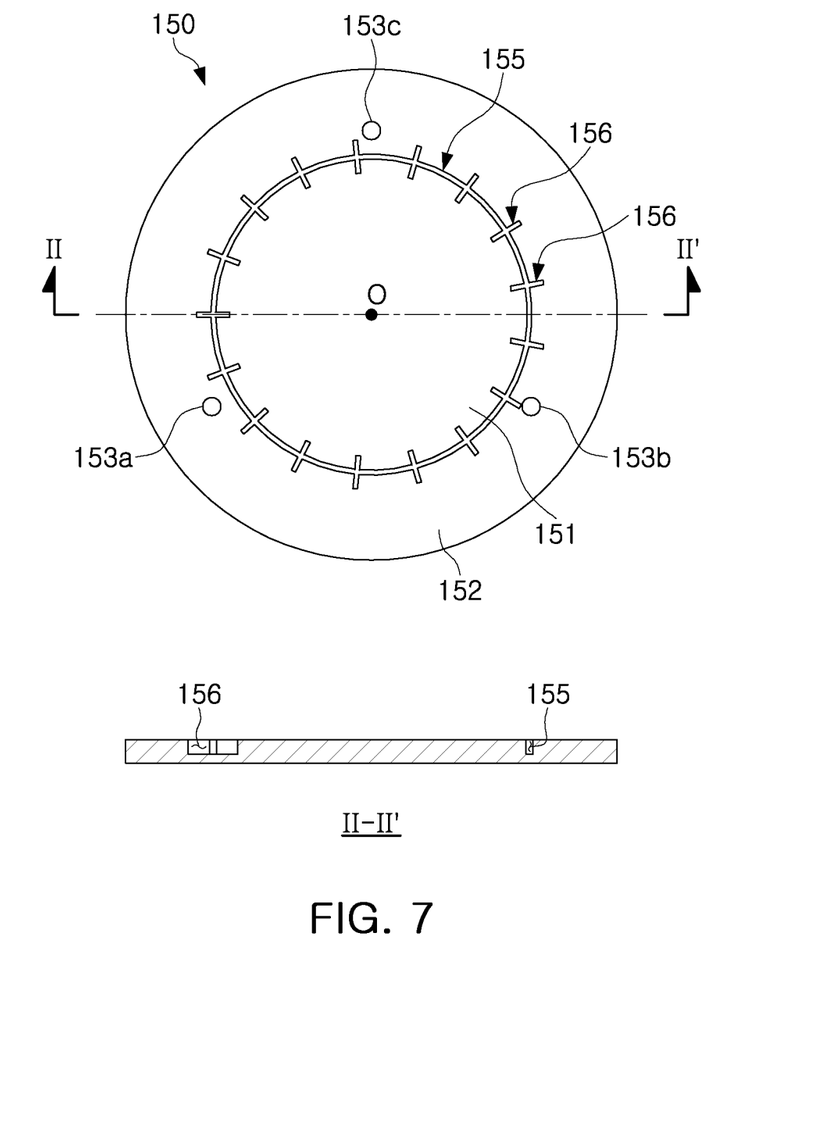
FIG. 7 illustrates a straight groove positioned in a surface of a cover screen, in accordance with one or more embodiments.

FIG. 6 illustrates an example groove of the cover screen 150, in accordance with one or more embodiments. FIG. 7 illustrates an example groove 154 positioned in the cover screen 150, in accordance with one or more embodiments.

The cover screen 150 may include a structure that guides the droplet to the peripheral portion 152 on an outer surface of the cover screen 150. In an example, the cover screen 150 may include the groove 154. The groove 154 may be recessed from its periphery.

In an example, the groove 154 may be positioned around the central portion 151. In an example, the groove 154 may have a shape of a circle extended in the circumferential direction based on the optical axis "O." In another example, the groove 154 may have a shape of a straight line extended in the radial direction based on the optical axis "O."

Accordingly, the droplet may more effectively fall into the peripheral portion 152 when the blades 161a, 161b, 161c wipe the central portion 151 in an example where the groove 154 is positioned in the cover screen 150. The droplet may have a shape that allows the droplet to have a minimized surface area in contact with air, and may thus have the smaller area in contact with the air when positioned in the groove 154 than when positioned on a flat surface (e.g., central portion 151). That is, when a portion of the droplet is positioned in the groove 154 and the other portion of the droplet is positioned in the central portion 151, the droplet may be moved closer to the groove 154.

Additionally, the groove 154 may block or minimize the droplet positioned in the groove 154 from being moved from the groove 154 to the central portion 151. Additionally, when the droplet has a large amount, the groove 154 may function as a passage through which the droplet not absorbed by the blade 161 may externally escape from the central portion 151.

In an example, the surface of the cover screen 150 may be treated with a water-repellent coating. In an example, when the central portion 151 of the cover screen 150 is treated with the water-repellent coating, the droplets deposited on the central portion 151 may have a shape of a beading, and may more easily fall from the central portion 151 or may be easily moved to the peripheral portion 152.

Referring to FIG. 6, in an example, the circular groove 154 may be positioned in the cover screen 150. Referring to FIG. 7, a circular first groove 155 and a linear second groove 156 may be positioned in the cover screen 150. In an example, the first groove 155 and the second groove 156 may cross each other.

A camera module (e.g. camera module 100 in FIG. 1) according to an example may include: a housing; a lens barrel (e.g. lens barrel 120 in FIG. 1) disposed in the housing (e.g. housing 110 in FIG. 1); a cover screen (e.g. cover screen 150 in FIG. 1) disposed on or above the lens barrel; one or more blades pivotably coupled to the cover screen and having at least a portion in contact with a surface of the cover screen (e.g., blades 161a, 161b, 161c illustrated in FIG. 2); and a rotation member disposed on the one or more blades 161a, 161b, 161c, and configured to pivot the blade with respect to the cover screen (e.g. rotation member 164 in FIG. 2).

In an example, the one or more blades 161a, 161b, 161c may each include an extension portion 163 that extends in a direction away from a pivot shaft of the one or more blades 161a, 161b, 161c, and configured to wipe the surface of the cover screen 150 as the one or more blades 161a, 161b, 161c is pivoted.

In an example, the cover screen 150 may include one or more fixing pins (e.g., fixing pins 153a, 153b, 153c as illustrated in FIG. 2), the one or more blades 161a, 161b, 161c may include one or more pin accommodation portions (e.g., pin accommodation portions 162a, 162b, 162c as illustrated in FIG. 2) that accommodate the respective fixing pins 153a, 153b, 153c, and the one or more blades 161a, 161b, 161c may be pivoted based on an interaction with the respective fixing pins 153a, 153b, 153c.

In an example, the one or more blades 161a, 161b, 161c may include respective driving pins (e.g., driving pins 166a, 166b, 166c as illustrated in FIG. 2), the rotation member may include one or more slots (e.g., slots 167a, 167b, 167c as illustrated in FIG. 2) that accommodate the respective driving pins 166a, 166b, 166c, and the respective driving pins 166a, 166b, 166c may be moved along with the slot as the rotation member 164 is moved.

In an example, the one or more slots (e.g., slots 167a, 167b, 167c as illustrated in FIG. 2) may be extended in a radial direction based on an optical axis.

In an example, the rotation member 164 may be disposed on the one or more blades 161a, 161b, 161c, and may have a shape of a disk including an incident hole (e.g., incident hole 165 in FIG. 2) corresponding to an optical axis.

In an example, the rotation member 164 may be rotatably coupled to the housing, based on the optical axis.

In an example, the one or more blades 161a, 161b, 161c may include a plurality of blades (e.g., blades 161a, 161b and 161c as illustrated in FIG. 2), and the plurality of blades may be arranged in a circumferential direction based on an optical axis.

In an example, the rotation member 164 may be interlocked to the plurality of blades in order for the plurality of blades to be pivoted in the same direction when the rotation member is rotated in one direction.

In an example, the one or more blades 161a, 161b, 161c may include a fabric member (e.g., fabric member 168 as illustrated in FIG. 5) in a portion of the one or more blades 161a, 161b, 161c, in contact with the cover screen 150.

In an example, the cover screen 150 may include a groove (e.g., groove 154 as illustrated in FIG. 6, and first groove 155 as illustrated in FIG. 7) extended in an outer surface of the cover screen in a circumferential direction based on an optical axis.

In an example, the cover screen may include a groove (e.g., second groove 156, as illustrated in FIG. 7) that extends in an outer surface of the cover screen 150 in a radial direction based on an optical axis.

In an example, the cover screen 150 may include a first groove (e.g. first groove 155 in FIG. 7) extended in an outer surface of the cover screen in a circumferential direction based on an optical axis, and a second groove (e.g. second groove 156 in FIG. 7) that extends in the outer surface of the cover screen 150 in a radial direction based on the optical axis, and the first groove 155 and the second groove 156 may cross each other.

A camera module according to an example may include: a housing 110; a lens barrel 120 disposed in the housing 110; a cover screen 150 disposed on the lens barrel 120; and a plurality of blades 161a, 161b, 161c, respectively pivotably coupled to the cover screen 150 and each having at least a portion in contact with a surface of the cover screen 150, wherein the plurality of blades 161a, 161b, 161c may be arranged in a circumferential direction based on an optical axis.

In an example, the cover screen 150 may include a groove 154 that extends in an outer surface of the cover screen 150 in the circumferential direction based on the optical axis.

In an example, the cover screen 150 may include a groove 155 extended in an outer surface of the cover screen in a radial direction based on the optical axis.

As set forth above, according to one or more examples, foreign materials such as droplets that obstruct a view of the camera module may be effectively removed, thus allowing the camera module to provide high-quality images.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
   a housing;
   a lens barrel disposed in the housing;
   a cover screen disposed above the lens barrel, and including a central portion that overlaps the lens barrel in an optical axis, and a peripheral portion that surrounds the central portion;
   a blade pivotably coupled to the cover screen, and configured to have at least a portion in contact with a surface of the cover screen; and
   a rotation member disposed on the blade, and configured to pivot the blade with respect to the cover screen,
   wherein the cover screen includes a groove that extends in an outer surface of the cover screen in a circumferential direction based on the optical axis, and
   wherein the groove is configured to be disposed between the central portion of the cover screen and the peripheral portion of the cover screen.

2. The camera module of claim 1, wherein the blade comprises an extension portion that extends in a direction away from a pivot shaft of the blade, and
   wherein the extension portion is configured to wipe the surface of the cover screen when the blade is pivoted.

3. The camera module of claim 1, wherein the cover screen comprises a fixing pin, the blade comprises a pin accommodation portion configured to accommodate the fixing pin, and the blade is configured to pivot based on the fixing pin.

4. The camera module of claim 1, wherein the blade comprises a driving pin, the rotation member comprises a slot configured to accommodate the driving pin, and the driving pin is configured to move along the slot when the rotation member is moved.

5. The camera module of claim 4, wherein the slot is configured to extend in a radial direction based on an optical axis.

6. The camera module of claim 1, wherein the rotation member is disposed on the blade, and is configured to have a shape of a disk comprising an incident hole corresponding to an optical axis.

7. The camera module of claim 6, wherein the rotation member is rotatably coupled to the housing, based on the optical axis.

8. The camera module of claim 1, wherein the blade comprises a plurality of blades, and the plurality of blades are arranged in a circumferential direction based on an optical axis.

9. The camera module of claim 8, wherein the rotation member is configured to be interlocked to the plurality of blades, and the plurality of blades are configured to pivot in a same direction when the rotation member is rotated in a first direction.

10. The camera module of claim 1, wherein the blade comprises a fabric member disposed in a portion of the blade, and the fabric member is configured to be in contact with the cover screen.

11. A camera module, comprising:
a housing;
a lens barrel disposed in the housing;
a cover screen disposed above the lens barrel;
a blade pivotably coupled to the cover screen, and configured to have at least a portion in contact with a surface of the cover screen; and
a rotation member disposed on the blade, and configured to pivot the blade with respect to the cover screen,
wherein the cover screen comprises a first groove that extends in an outer surface of the cover screen in a radial direction based on an optical axis.

12. The camera module of claim 11, wherein the cover screen comprises a second groove that extends in an outer surface of the cover screen in a circumferential direction based on the optical axis, and the first groove and the second groove cross each other.

13. A camera module, comprising:
a housing;
a lens barrel disposed in the housing;
a cover screen disposed over the lens barrel, and including
a central portion that overlaps the lens barrel in an optical axis, and a peripheral portion that surrounds the central portion; and
a plurality of blades, respectively pivotably coupled to the cover screen and each of the plurality of blades configured to have at least a portion in contact with a surface of the cover screen,
wherein the plurality of blades are arranged in a circumferential direction based on an optical axis,
wherein the cover screen includes a first groove that extends in an outer surface of the cover screen in a circumferential direction based on the optical axis, and
wherein the first groove is configured to be disposed between the central portion of the cover screen and the peripheral portion of the cover screen.

14. The camera module of claim 13, wherein the cover screen comprises a second groove that extends in an outer surface of the cover screen in a radial direction based on the optical axis, and the first groove and the second groove cross each other.

* * * * *